United States Patent [11] 3,612,165

[72] Inventor Anthony Charles Rendell Haynes
  Brighton, England
[21] Appl. No. 875,630
[22] Filed Nov. 12, 1969
[45] Patented Oct. 12, 1971
[73] Assignee Gulton Europe Limited
  Brighton, England
[32] Priority Nov. 12, 1968
[33] Great Britain
[31] 53660/68

[54] TEMPERATURE CONTROLLERS
  16 Claims, 4 Drawing Figs.
[52] U.S. Cl. .................................................... 165/26
[51] Int. Cl. .............................................. F25b 29/00
[50] Field of Search ........................................ 161/26, 27

[56] References Cited
  UNITED STATES PATENTS
3,329,202 7/1967 Birman ........................ 165/26

Primary Examiner—Charles Sukalo
Attorney—Young & Thompson

ABSTRACT: A temperature controller for maintaining temperature at a set point, controls both heating and cooling. Means responsive to a temperature-error signal provide a first output including proportional and integral terms or proportional, integral and derivative terms. This signal is utilized to control heating power and means are provided operative when the heating power is less than a predetermined proportion of the maximum to provide a second output signal for controlling the cooling power. The second output signal is derived directly or indirectly from the first output signal or directly or indirectly from an initiating signal producing the first output signal so that the cooling power increases from a minimum to a predetermined level as the heating power falls from said predetermined level to a minimum.

TEMPERATURE CONTROLLERS

BACKGROUND OF THE INVENTION

1. Field of the Invention

This invention relates to temperature controllers for use where control has to be effected of means both for heating and for cooling so as to maintain a required temperature.

As an example of this requirement, in many forms of plastics processing machinery, it is required to operate the machinery at a temperature above ambient temperature. However, during processing of the plastics material, heat is generated and thus heating of some parts of the machine is required only during a warmup cycle before the machine can be set in operation. When the temperature has reached the required level, the machine can be set in operation and then it is necessary to cool the machine instead of heating it. As a particular example, this problem arises in machines, such as extrusion or injection molding machines, processing rigid polyvinyl chloride. It is necessary to heat the barrel initially to bring it up to the operating temperature. When the temperature of the machine is stabilized, the motor driving the screw can be started and the plastics material is passed through the machine, being heated, compressed, semiliquified and finally molded or extruded into its final form. In certain zones of the machine, such a large amount of frictional heat is produced by the action of the screw working on the plastics material that more heat is generated by the screw than is required to maintain the temperature of the plastics material at the right temperature for the production process. It is therefore necessary to apply cooling to the machine at those places where excessive heat is generated. In this case therefore a temperature controller is required for these critical zones of the machine which serves to control the application of heat during the starting up period and thereafter to apply cooling or a combination of heating and cooling in the production process.

More generally however the control of both heating and cooling may be required in processing plant or machinery where a predetermined temperature level has to be maintained and where heat may be absorbed or given out. Control both of heating and cooling may also be required where it is required to stabilize a temperature either above or below ambient temperature. Further applications include programming of temperature, where the process temperature is to be raised and lowered at predetermined rates and where the rate of fall of temperature requires the application of cooling.

2. Prior Art

The problem may be more readily understood by considering attempts which have been made in the past to control the application of heating and cooling to a plastics machine.

The earliest method of applying cooling to a plastics machine involved an instrument with two temperature set points, the lower being used to control heating power, and the upper set point being set a few degrees higher to switch on cooling when the temperature continued to rise above the lower set point. The effect of this type of cooling was invariably to reduce the temperature to below the upper set point and an oscillation of temperature would result. In plastics machinery it is essential that there is no oscillation of temperature at any zone of the machine, and more especially at the zones where cooling is required as these zones are the most critical for the correct processing of the plastic. Any controller giving on/off heating or cooling is liable to produce an oscillation of temperature largely due to the very large thermal mass of metal and the inevitable thermal lag between power being changed and the sensing element (thermocouple or resistance element) responding. The only way to obtain stable temperature control of plastics machinery with on/off heating is therefore by speeding up the on/off cycle artificially to a typical 20 seconds by the addition of an "anticipatory" or "proportioning"d action, but it is not so easy to extend this principle to include cooling. A two set-point controller with a time proportioning on/off action on both positions will give smooth power control from heating to cooling, but the final controlled temperature can vary over the whole width of the double proportional band depending on the power requirement at the time. Any instrument with two set points each giving proportional, stepless or on/off proportioning control of heating and cooling would produce a similar temperature offset over the double proportional band. This inevitable temperature offset, obtained with all proportional controllers without integral reset, can cause problems in plastics processing, and the modern requirement is therefore for the controller to include an integral reset action. For heating control only, a two- or three-term controller including integral reset, can give perfectly stable temperature control, under all conditions of power requirement from nearly zero to maximum, but if cooling is required, then the control is more difficult. If a second set point is added to the instrument for the addition of cooling, it could give on/off, proportional, or three-term control. In the case of an on/off second set point control set to give cooling when temperature rises above the lower set point, it necessarily follows that control cannot be stable, as the temperature has to rise above the set point to switch cooling on, and the on/off cooling control without any proportioning action would cause temperature to fluctuate around the cooling set point. If the second set point has a proportional action using either time proportioning on/off or proportional and stepless control of cooling then the three-term control of temperature by the heating set point will give stable control provided it is within the proportional band of the cooling set point, and provided that the cooling applied at that position is neither too little to prevent overheating with no heating power applied nor too much to prevent a fall of temperature with heating turned fully on. The upper set point in this type of controller would give the equivalent only of a manually adjustable cooling control, and the controller would give three-term heating control with integral set point using a constant cooling rate. If the second set point is set to the wrong position, either too high or low, then the temperature will rise or fall to a different position within the proportional band of the upper set point at which the temperature is maintained constant either with no heating power and a small amount of cooling or an unnecessarily large amount of cooling and maximum heating power. In both cases there would be a temperature offset. Between these two extremes there would however be a region of stable power control, although much of the heating power could be wasted by the setting of the second set point to give too much cooling.

The uncertainty of this system could be overcome partly by linking, mechanically or electrically, the cooling set point to the heating set point. This could then be set to a fixed position relative to the heating set point at which adequate cooling is always applied when the instrument is controlling on the set temperature. The system is however still not ideal, as cooling would be applied when it is unnecessary, and the controlled temperature will still have to rise to obtain more cooling than is fixed by the position of the second set point.

The third possibility of using a controller with two set points each with two or three terms introduces an inherently unstable form of control. Even if the different time lags in the heating control and cooling control loops did not produce a sufficient phase shift to produce oscillation, then only one or other of the two systems could produce a stable temperature control. Thus when the process required heating, the heating set point would determine the controlled temperature, while the cooling control system would have switched cooling off completely. Similarly, when cooling was required, the cooling set point would take charge, heating would be turned off, and the instrument would control to the cooling set point.

If the cooling set point is lower than the heating set point, the control would be most unsatisfactory as either the cooling set point would take charge and control with heating power turned full on, or the temperature would rise sufficiently to enable the heating set point to control with the cooling turned fully on. In either case the waste of power would be considerable, and for this reason the cooling set point would have to be placed at a sufficiently higher temperature for there to be no risk of a change of calibration resulting in the effective cooling set point becoming lower than the heating set point.

If the processing machine fluctuated in its requirement from heating to cooling at different times during the production process, then the instrument would necessarily switch from one control set point to the other. This problem plus the high probability of instability due to interaction of the two control loops makes a two set point instrument with two- or three-term control on each impractical.

There are thus two conflicting requirements in the heating of plastics processing machines: firstly the requirement of a two- or three-term controller to control heating to a temperature exactly as set, secondly to control cooling as and when required without the possibility of interaction between the heating and cooling circuits. While there are controllers which can control either heating or cooling adequately on their own, there is no controller able to control both at the same time, without either deviation from set point or tendency to oscillation or the need for careful setting to avoid interaction. As a result of this, the only satisfactory method of obtaining precise temperature control at the existing state of the art is to use a manually controlled amount of cooling (either a continuous draught of air adjusted by damper vanes, or circulating water or oil adjusted by flow control valves) which is sufficient to prevent overheating and yet not too much to cause either waste of heating power or complete failure to maintain operating temperature. The weakness of this system is obviously the need for careful adjustment and the risk of either human failure to switch cooling on or faulty adjustment of the valves.

A two set-point instrument with two- or three-term control on the heating set point, that is to say proportional and integral or proportional, integral and derivative is not the answer to the problem as whatever form of control is applied by the second set point it will either tend to be unstable or will need careful manual setting to prevent instability so leaving the system open to human error.

SUMMARY OF THE INVENTION

As previously indicated, the present invention is not restricted to the particular problems of plastics machinery but is more generally applicable to the control of temperature where both heating and cooling means have to be used. For the purposes of explaining the present invention, it is convenient to distinguish between the case where the normal operating temperature is above ambient so that appreciable power is required for heating whereas little power is required for effecting cooling (in this case usually by fans or by liquid pumps) and the case where refrigerating means have to be used for effecting cooling, i.e., where the operating temperature is below ambient. In the following explanation of the invention, the first of these cases will be considered. This is the most common case where it is required to maintain temperature at a required level above ambient. It will however later be explained how the invention is equally applicable to the second case.

According to this invention a temperature controller for maintaining temperature at a set point comprises means responsive to a temperature-error signal to provide a first output including proportional and integral terms or proportional, integral and derivative terms, means for utilizing said first output to control heating power and means operative when the heating power is less than a predetermined proportion of the maximum to provide a second output signal for controlling the cooling power, the second output signal being derived directly or indirectly from the first output signal or directly or indirectly from an initiating signal producing the first output signal so that the cooling power increases from a minimum to a predetermined level as the heating power falls from said predetermined level to a minimum. With this arrangement, the first output controls the heating, making use of two- or three-term control. Such controllers for controlling heating alone are in themselves known. When however the requirements for heating power fall to said predetermined proportion, in the arrangement of the present invention the cooling means are brought into operation to increase the cooling from the minimum, which will usually be zero, gradually to a predetermined level, possibly the maximum, as the heating power requirement falls. The control of the cooling is effected by the second output signal which may be derived directly or indirectly from the first output signal; the second output signal might, for example, be derived from the power applied to the heating circuit. When the requirements for heating power fall below said predetermined proportion, both heating and cooling are applied simultaneously using only one control loop. During this condition, the control loop gain is higher than would be the case when only heating is being controlled and a wider proportional band will be required. The two or three terms for the controller have therefore, in the way well known in the art, to be adjusted so that the control loop is stable during the conditions when both heating and cooling are being applied. The requirements for stability of control loops for two- or three-term controllers are well known and will not be further discussed. In the arrangement of the present invention, the heating power and cooling power are controlled together over part of the range so that there is no possibility of interaction which might lead to instability. Conveniently the second output is inversely proportional to the first output over a chosen portion of the heating power band.

As is well known with many temperature controllers, difficulties are experienced in operating at close to zero power requirements, either because cooling is required or because of nonlinearity in the power control circuit. As it is important to avoid a "step" in power at any part of the power control band that is used during normal operation, it is of advantage to arrange the second output such that maximum cooling power is achieved while the heating power is at a level above the critical point at which instability may be introduced. Although this would result in a small power loss, and an equal reduction in the maximum cooling power, the control of temperature would be equally stable over the whole power control band. As before, the proportional and integral terms in the control loop must be adjusted to give stability when the loop gain is maximum usually where the heating and cooling bands overlap.

In an alternative type of controller, the second output signal may be derived from a signal which in turn produces the heating power signal, but where the heating power is arranged to be adjusted from minimum to maximum over a chosen fraction of its total range. This would leave the remaining fraction of the signal, plus a small overlap for the generation directly or indirectly of a cooling control signal. There would in this case be a need for only a small power overlap between the heating and cooling control signals, the transition point between heating only, and heating and cooling being set to near zero heating power. As in the previous case, the heating power control must be smooth down to zero, and any step or sharp cutoff would produce instability. If this is not possible, then the heating power must be limited by electronic means so that it "bottoms" at a prescribed safe level of power.

Since now the cooling control band continues below the heating control band while heating power is zero or limited to a minimum level, the cooling power may be defined as being inversely proportional to heating power output, and continuing to be inversely proportional to an imaginary extension in the negative direction of the heating power characteristic.

In none of the methods described for the inclusion of a second output signal for cooling purposes is it implied that the heating control signal is linear. The heating control signal may either accidentally or deliberately be nonlinear. In the case of excessive nonlinearity it may be desirable to compensate for this in the generation of the second output signal. On the other hand, it may be used to advantage to reduce the loop gain in the region over which the heating and cooling bands overlap. In all cases the proportional integral and derivative terms in the control loop must be set to give stability at that point where the loop gain is highest from maximum heating to maximum cooling.

The controller may very conveniently be an electronic controller but the invention is equally applicable to other types of controller for example pneumatic controllers.

The control of the heating may be by stepless proportional control or by on/off time proportioning control. For many purposes on/off heating can be made to give stable temperature control if the total on/off cycle time is speeded up by the action of anticipatory or proportioning action when the thermal mass of the machine is too large to respond to the comparatively long pulses of power. The control of cooling likewise may be by stepless proportional control or by time proportioning on/off operation.

Thus, in one embodiment of the invention, and in which an electronic controller is used, the first output controls the heating by providing firing pulses for thyristors. Phase control of the thyristor firing angle may be employed but preferably complete cycles or half cycles of alternating current power are utilized for heating, the controller causing the thyristors to fire for complete cycles or half cycles of the alternating current power supply during the appropriate proportion of the alternating current cycles to obtain the required heating power output. The cooling control is conveniently effected by means of a proportional valve controlling the flow of a coolant. In this case a stepless proportional control is conveniently employed. However, it may in some cases be more convenient to apply cooling using an on/off system provided the on/off period is sufficiently short. In this case, the cooling control signal may be obtained from the heating control circuit, being made to alter the ratio of the "on" time to the "off" time in the proportioning on/off cooling circuit.

In a typical arrangement, the controller may be arranged so that the cooling control means operative when the heating power has fallen to say 20 percent of the maximum possible output power. The maximum cooling power might be 20 percent of the maximum heating power and in this case the total power into the machine or other device to be controlled may be controlled from the maximum heating, that is 100 percent heating, to the maximum cooling which is equivalent to −20 percent heating. Increase of cooling may, however, theoretically be continued after the heating power input has been reduced to zero although this may not be practical if the heating power is controlled proportionally to the power control signal and over its whole range.

It will be appreciated that while the cooling means are operative the heating means are also operative. This inherently is a waste of power and hence it is desirable to limit the range over which the heating and cooling means are operative together to the minimum necessary. For this purpose adjusting means may be provided by which the range over which the cooling means are operative, i.e., the maximum cooling power, is adjustable. Means may be provided for giving a warning signal if the cooling means are opened to the fullest extent; this indicates that the range of operation of the cooling means has been adjusted to a level which is too low. In an electronic system, such warning means may conveniently be operated by a trigger circuit arranged to operate when the control signal for the cooling power calls for cooling power requirements at the maximum level.

In the above description, it has been assumed that the maximum heating power requirement is greater than the maximum cooling power requirement. The invention is also applicable to the converse conditions. It will be immediately apparent that, in this case, the first output from the controller is used to control the cooling and the second output is used to control the heating. It will be appreciated that in a system arranged to operate normally above ambient temperature, power is required for heating whereas the cooling to extract heat may require much less power. In such an arrangement therefore the cooling would be brought into operation at the lowest possible fraction of the heating power consistent with being able to maintain a stable control of the temperature. To operate cooling when large quantities of heat is required is merely wasteful. As a general rule if the maximum cooling power is $x$ percent of the heating power, then the transition point should be set at $x$ percent. Assuming a linear characteristic then the loop gain is doubled and the proportional band would have to be correspondingly wider. The 2:1 change in slope of the power control characteristic means that with the three-term control set to give best stability with maximum loop gain where the heating and cooling bands overlap, the reduced gain on heating only is not too low to give sluggish control. If the transition point is made lower than suggested above, heating control will become progressively more sluggish compared with heating and cooling together. On the other hand in a system to operate normally at temperatures below ambient, refrigeration plant has to be provided for cooling and hence substantial power may be consumed by the cooling system. Here it is therefore necessary to avoid as far as possible operation of the heating means unnecessarily when cooling is required and hence the heating would be brought into operation when the cooling power requirements have fallen to some appropriate fraction of the maximum, this again being chosen so that stable temperature control may be obtained.

DESCRIPTION OF THE PREFERRED EMBODIMENT

Figure 1:
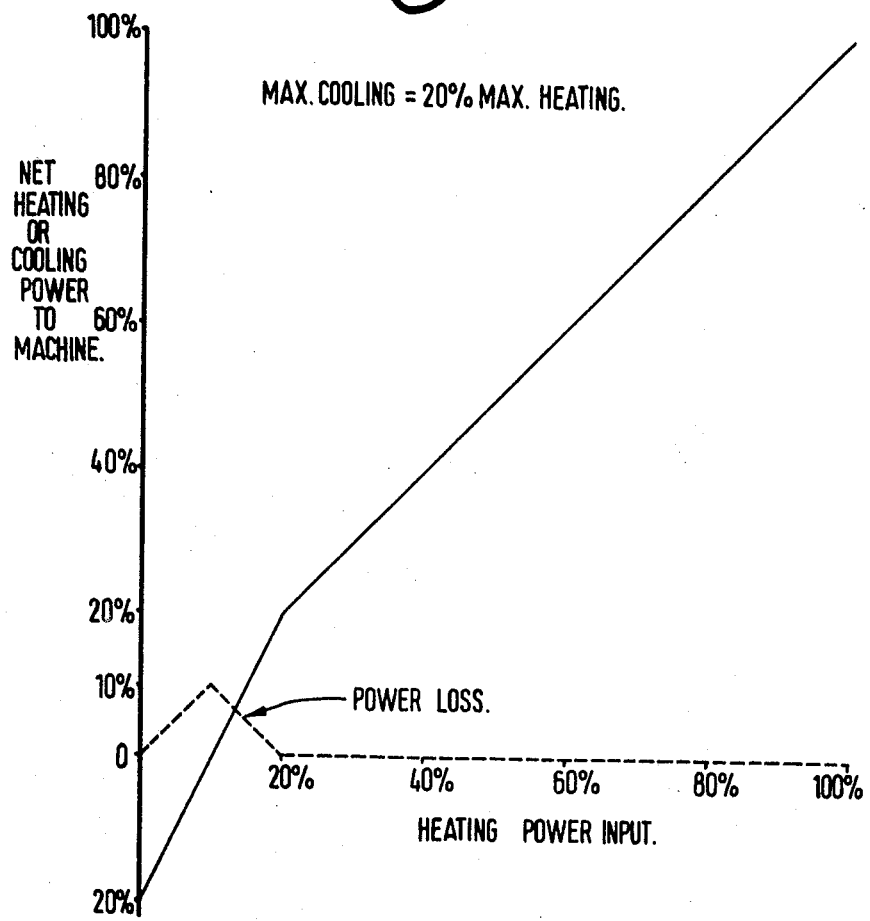
FIG. 1 is a graphical diagram showing the heating and cooling power effectively applied to a plastics processing machine plotted against the heating power input.

Referring to FIG. 1, the ordinates of the graph represent the actual net heat or cooling applied to the machine, i.e., where both heating and cooling are simultaneously applied, the ordinate represents the difference between the heating input and the cooling input. In this particular example the maximum cooling is 20 percent of the maximum heating and hence the total variation is from 100 percent heating to negative heating, that is cooling, equal to 20 percent of the maximum heating. The abscissa of the graph represents the heating power input. Above 20 percent heating power input, no cooling is applied and hence the heating power input is the actual power applied to the machine. Below 20 percent heating power input, the graph in the solid line illustrates the relationship between the net heating power or cooling power applied to the machine and the power input to the heating means. In this particular example, the cooling power is increased linearly inversely proportional to the heating power input. For a machine to work at a temperature above temperature, the power requirements for going up to 50 percent; this is because zero cooling power input is at 10 percent heating power input. extracted. The dashed curve represents the power loss on the assumption that negligible power is required to effect the cooling. The power loss is that consumed in the heating circuit due to the fact that both heating and cooling are applied simultaneously and the power is wasted in supply to the heating input because it has to be extracted by the cooling means.

Referring to FIG. 2, the ordinates again represent the actual net heat or cooling power applied to the machine. In this case provision is made for a maximum cooling equal in power to 50 percent of the heating power. The abscissa of the graph represents for positive values the heating power as before, but in this case the negative heating power is imaginary. The graph is marked in this region to show cooling power applied. Above 10 percent heating power input, no cooling is applied, and the heating power to the machine is therefore equal to the heating power input. Below 10 percent heating input cooling is applied at a rate equal to the reduction in heating power, so that 10 percent cooling is applied when heating power input equals zero. Beyond the zero input power line cooling continues at the same rate to a maximum which is set to 50 percent. It will be seen therefore that to the left of the zero value for heating power input, the graph shows cooling power input is at 10 percent heating power input.

It will be noted from the dashed curve that the maximum heating power loss in this case is 5 percent, much lower than it would have been if cooling power had been applied between 50 percent and zero of the heating power input in the method of FIG. 1.

Figure 2:
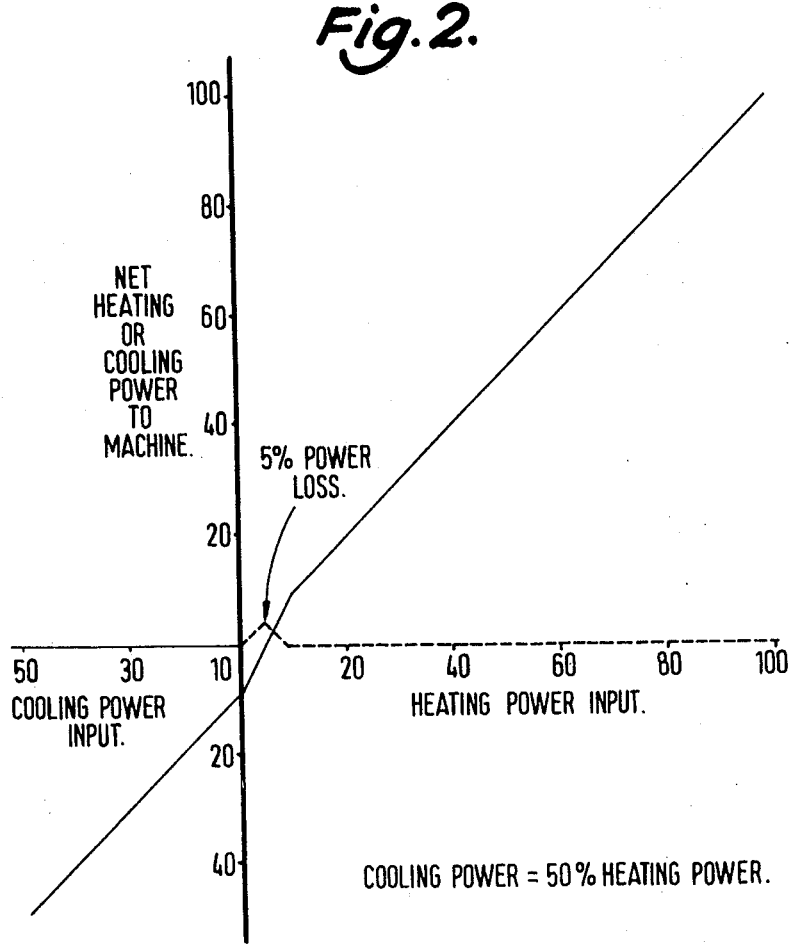
FIG. 2 is another graphical diagram, similar to FIG. 1 but showing the heating and cooling power characteristic when the cooling is arranged to extend below the zero heating point.

The method illustrated in FIG. 2 is therefore more suitable for applications requiring substantially equal power availability for both heating and cooling, as the smaller crossover region permits a smaller power loss.

Figure 3:
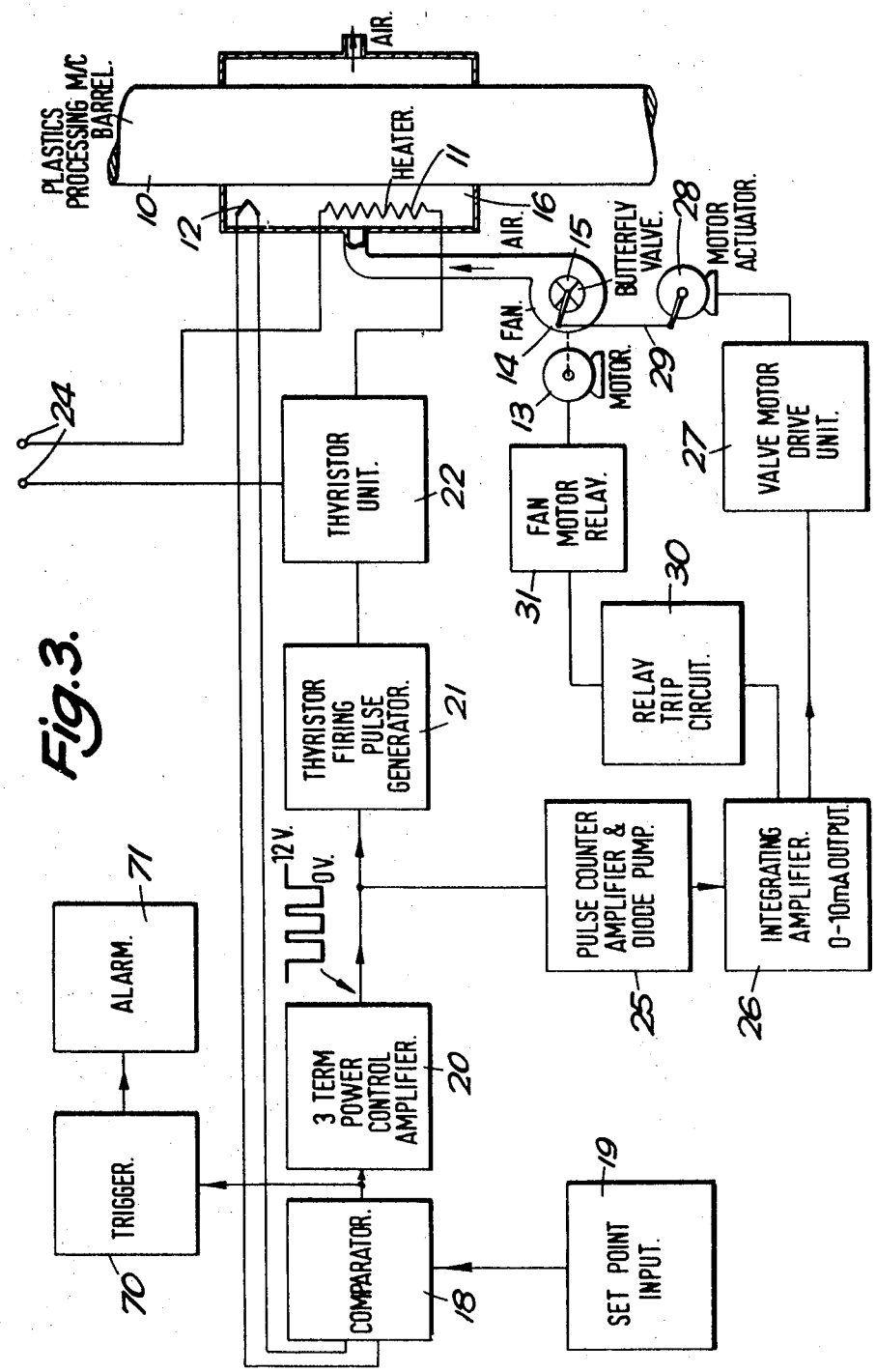
FIG. 3 is a block diagram illustrating a temperature controller for a plastics processing machine.

FIG. 3 is a block diagram illustrating a temperature controller which may be used to effect control of heating and cooling means to obtain the relationship illustrated in FIG. 1. Referring to FIG. 3 there is shown diagrammatically a barrel 10 of a plastics processing machine. This barrel has an electric heater 11 for heating part of the barrel, a thermocouple 12 for sensing the temperature of this part of the barrel and cooling means consisting of a fan motor 13 driving a centrifugal fan 14 having a butterfly valve 15 which controls the air output to a cooling jacket 16 around the barrel 10.

The temperature signal from the thermocouple 12 is fed to a comparator 18 which compares it with a set temperature signal from a set point input 19 and produces an error signal which is amplified by a three-term temperature-controller amplifier 20 to provide a power control signal. This control signal is thus dependent on the error signal but includes proportional, integral and derivative terms. In this particular embodiment, the control output from the unit 20 is in the form of a series of pulses of duration substantially equal to the duration of a cycle of alternating supply mains utilized for the heating power supply. These pulses are synchronized with the mains frequency (50 Hz. or 60 Hz.) and are applied to a thyristor firing pulse generator 21 which controls a thyristor unit 22 in a circuit between the heater 11 and mains supply terminals 24. The unit 20 controls the number of pulses which occur so that over a period of time, say 20 seconds, the total number of pulses is proportional to the required output power to the heater. In this particular embodiment, when the thyristor pulses should be off, the output from the controller is at +12 volt level. The pulses are represented by changes to 0 volts. The duration of each pulse is substantially that of a complete mains cycle but there is a return to the +12 volt level for a period of 1 millisecond at the end of each pulse which is used to ensure that the thyristors turn off at the end of each mains cycle.

It will be seen that the apparatus thus far described gives three-term control of the heating with a very high-speed-type of proportional on/off control of the heating, the heating pulses being synchronized with and of substantially the duration of integral cycles of the mains supply. Control systems of this nature are known, as for example in the specification of British Pat. No. 1,021,425, and no further description will therefore be given of this part of the controller. The output pulses from the unit 20 are also used in this embodiment to control the operation of the butterfly valve 15 in the air cooling system. For this purpose, the pulses from the unit 20 are fed to a pulse counter and diode pump unit 25 which will be described in further detail with reference to FIG. 4 and which gives an output, in this particular case, of current proportional to the heating power. This is fed to an integrating amplifier 26 to provide an output current linearly varying between 0 and 10 milliamps in a manner inversely proportional to the heating power. The output from the integrating amplifier 26 is applied to a valve motor drive unit 27 controlling a motor actuator 28 which by means of a linkage 29 drives the aforementioned butterfly valve 15. The motor actuator typically has a built-in potentiometer which is connected in a balancing circuit in the valve motor drive unit 27 so that the unit 27 drives the actuator 28 in the appropriate direction until balance is achieved between the current input signal and the feedback from the potentiometer in the motor actuator 28. The output from the integrating amplifier 26 is also applied to a relay trip circuit 30 which controls a fan motor relay 31 for switching on the aforementioned fan motor 13 just before the current output from the integrating amplifier 26 starts to move from zero.

Figure 4:
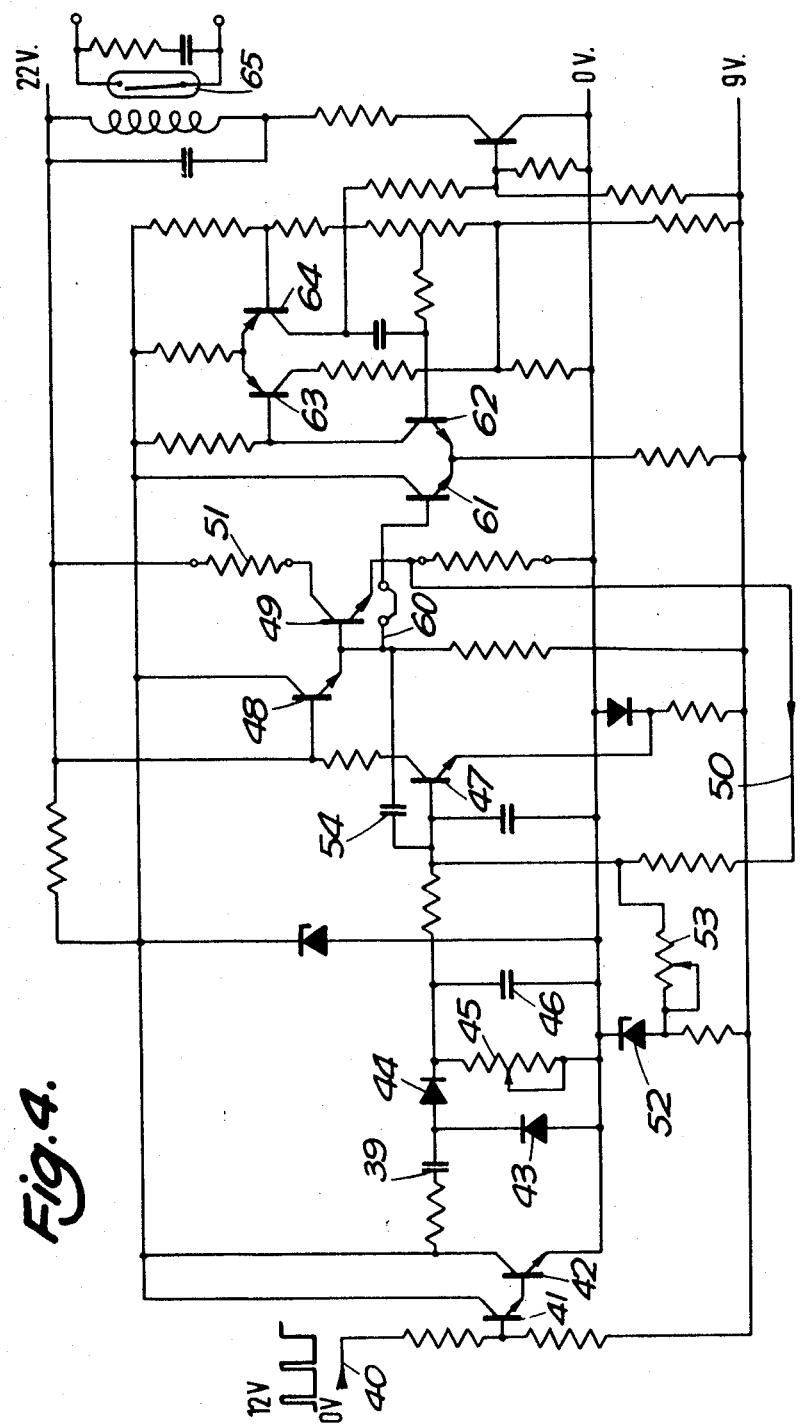
FIG. 4 is a second diagram showing in further detail the circuits employed in part of the apparatus of FIG. 2.

Referring to FIG. 4, the units 25, 26 and 30 are illustrated in further detail. The input pulses from the unit 20 on a lead 40 are applied to a buffer amplifier consisting of transistors 41, 42 and the output to this amplifier is applied to a diode-pump circuit incorporating feed capacitor 39 and diodes 43, 44, with a resistor 45 and capacitor 46 in parallel across the output leads. The diode pump gives a positive output current proportional to the heating power. A bias current of opposite polarity is obtained, as will be described later, from a stable voltage reference. The sum of these two currents is fed to a DC amplifier and integrator consisting of transistors 47, 48, 49 with current feedback over a lead 50 from the output so that the output voltage will stabilize at a level at which the current feedback equals the difference between the bias current and the diode-pump current. A current output proportion to the output voltage is thus obtained from the output of this amplifier and integrator stage 47, 48, 49 in a load indicated diagrammatically by a resistor 51. The aforementioned bias current for the diode pump is obtained from a Zener diode 52 via a resistor 53 which is set so as to give 10 milliamps output (that is at the load 51) when the heating power called for by the input on lead 40 is zero. The aforementioned resistor 45 is a bleed resistor which reduces the diode-pump output and is set so that the output, that is the current transferred from the feed capacitor 39 by diode 44 into the input of the first transistor 47 of the amplifier and integrator, equals and cancels the bias current when the heating power called for by the pulses on lead 40 is at the required level at which the cooling is to be brought into operation. In the particular example illustrated in FIG. 1 this was when the heating had fallen to 20 percent of its maximum value. Thus the sum of the bias current and the output of the diode pump is zero at this transitional point, namely 20 percent of maximum heating power, and increases to a maximum when zero heating power is demanded. The DC amplifier and integrator circuit 47, 48, 49 has an integrating capacitor 54 which gives a time constant of 20 seconds to the amplifier response and so gives a steady amplifier output despite the random pulses on the input lead 40. The current output at the load 51 is fed to the aforementioned valve motor drive unit 27 for controlling the motor actuator 28.

For operating the relay trip circuit 30, an output is taken from the transistor 48 in FIG. 4 by means of a lead 60. This is applied to a differential amplifier consisting of transistors 61, 62 forming the first stage of a trigger circuit to give a signal just before the current output to the valve motor drive unit starts to move from zero. The trigger circuit consists of transistors 61, 62, 63, 64 and controls a reed relay 65 which operates the aforementioned fan motor relay 31. A trigger circuit 70 (FIG. 3), similar to that just described for operating the fan motor relay, is used to operate an over-temperature alarm 71 circuit in the event of failure in the cooling system, the trigger circuit 70 being connected to the error signal from the comparator 18 which is fed to the temperature-control circuit 20.

In normal operation, the heating power only falls to such a value as is necessary to open the cooling control valve 15 sufficiently to extract both the internal heat from the machine and the remaining heating power from the power control circuit. If the heating power input were to fall to zero, the valve 15 would be fully open and the rate of heat extraction is maximum possible. The system has to be arranged so that this rate of heat extraction is higher than is ever required by the machine under all processing conditions. If, in practice, the maximum required cooling power is found to be less than this, then waste of power can be reduced by reducing the maximum heat extraction rate. It is convenient then to reduce the level of the transition point at which the cooling is brought into operation. The aforementioned over-temperature alarm is desirable if provision is made for adjusting the amount of cooling, the alarm indicating if the cooling adjustment is set too low.

I claim:

1. A temperature controller for maintaining temperature at a set point comprising means responsive to a temperature-error signal to provide a first output including at least proportional and integral terms, means utilizing said first output to control heating power, means responsive to said first output to provide a second output signal varying with temperature when the heating power is less than a predetermined proportion of the maximum, and means responsive to said second output signal to control the cooling power so that the cooling power increases from a minimum to a predetermined level as the heating power falls from said predetermined level to a minimum.

2. A temperature controller as claimed in claim 1 wherein the second output signal increases the cooling from zero to a maximum as the heating power falls from said predetermined level to a minimum.

3. A temperature controller as claimed in claim 1 wherein said second output is inversely proportional to the first output over a chosen portion of the heating power band.

4. A temperature controller as claimed in claim 1 wherein said means for utilizing said first output to control heating power is operative to adjust the heating power from a minimum to a maximum over a chosen fraction of the total range of said first output and wherein the second output signal controlling the cooling power is derived from the first output to increase the cooling power from a minimum to a predetermined level as the heating power falls from said predetermined level to a minimum and to increase the cooling power to a maximum with further change of said first output after the heating power has fallen to said minimum.

5. A temperature controller as claimed in claim 1 wherein the heating power is nonlinearly related to the first output signal.

6. A temperature controller as claimed in claim 1 wherein the control of the heating is by a stepless proportional control.

7. A temperature controller as claimed in claim 1 wherein the control of the heating is by on/off time proportioning control.

8. A temperature controller as claimed in claim 1 wherein the control of the cooling is by stepless proportional control.

9. A temperature controller as claimed in claim 1 wherein the control of the cooling is by time proportioning on/off control.

10. A temperature controller as claimed in claim 1 and comprising an electronic controller wherein thyristors are provided for controlling the heating power in accordance with said first output.

11. A temperature controller as claimed in claim 10 wherein said first output is arranged to cause the thyristors to fire for complete cycles or half cycles of an alternating current power supply during the appropriate proportion of the alternating current cycles to obtain the required heating power output.

12. A temperature controller as claimed in claim 1 wherein the control of cooling is effected by means of a proportional valve controlling the flow of a coolant.

13. A temperature controller as claimed in claim 1 wherein adjusting means are provided for adjusting the range of said first output over which the cooling means are operative.

14. A temperature controller as claimed in claim 1 wherein means are provided for giving a warning signal if the cooling means are open to the fullest extent.

15. A temperature controller as claimed in claim 1 and for use where the maximum cooling power requirements are greater than the maximum heating power requirements wherein said first output from the controller is used to control the cooling instead of the heating and wherein the second output is used to control the heating instead of the cooling.

16. A temperature controller for maintaining temperature at a set point comprising means responsive to a temperature-error signal over a predetermined temperature range to provide a first output including at least proportional and integral terms, means responsive to the first output signal to provide a second output signal varying with temperature over part only of said predetermined temperature range, means utilizing one of said first and second output signals to control heating power, and means utilizing the other of said output signals to control cooling power.